United States Patent Office 2,784,110
Patented Mar. 5, 1957

2,784,110

ORGANOPHILIC ATTAPULGITE AND PROCESS OF MAKING SAME

William S. Tatlock, Ardentown, Del., assignor to E. I. du Pont de Nemours and Company, Wilmington, Del., a corporation of Delaware No Drawing. Application January 6, 1954, Serial No. 402,601

11 Claims. (Cl. 117—54)

This invention relates to methods for converting attapulgite clay from its naturally-occurring, hydrophilic, non-fibrillated form into a form in which it is dispersible as organophilic fibrils, and is more particularly directed to such processes in which the naturally-occurring attapulgite is mixed with water sufficiently vigorously to fibrillate and suspend it, the water is replaced with an organic liquid which is at least partially miscible with water, organosilane-reactive material, except reactive groups on the attapulgite, is removed, and contact is effected between the attapulgite and a hydrolyzable organosilane, whereby organosilyl groups become chemically bound to the surface of the attapulgite making it organophilic. The invention is further directed to the so-produced, organophilic attapulgite which is dispersible in fibrillated form, and especially to organophilic products in which the substrate is fibrillated attapulgite having a surface area greater than 150 square meters per gram.

Attapulgite is a fibrous clay, the individual particles of which occur in nature as bundles or aggregates of minute fibrils. The usefulness of this material for many purposes could be enhanced if it could be dispersed into its individual fibrils and then dried without reagglomeration, but methods hitherto used have not been adequate for this purpose. By beating or otherwise vigorously agitating the clay in water to break it up into its individual fibrils and then drying it from water, powders having specific surface areas in the range below about 125 square meters can be obtained. I have observed that the specific surface area of the attapulgite fibrils in such aqueous dispersions is greater than in the dried powders, and have therefore recognized that a change in the physical form of the product occurs during the drying.

The usefulness of attapulgite for some purposes has also been restricted by its water-sensitivity—that is, the product has been hydrophilic rather than organophilic or hydrophobic. For some uses an organophilic product is highly desirable.

Now according to the present invention it has been found that by drying a fibrillated dispersion of attapulgite from an organic liquid which is at least partially water-miscible and by reacting the dried, fibrillated attapulgite with a hydrolyzable organosilane there is obtained an organophilic powder which has a surface area greater than 150 square meters per gram and which is readily redispersible.

In a process of this invention the raw attapulgite clay is first dispersed in water. This dispersion can be effected by beating the clay in the water in a mill producing high shear, such as a Waring Blendor or a colloid mill, or the clay and water can be mixed in a mill which subjects the attapulgite to substantial attrition, such as a ball mill. If desired, a dispersing agent such as a sodium phosphate can be used to assist in dispersing the clay. The agitation or beating is continued until a homogeneous mixture is obtained. The degree of dispersion of the attapulgite can be established by observation under an electron microscope, where it will be seen whether or not the clay has been broken up into its individual fibrils. These fibrils are in the submicroscopic range in size because of the small diameter. Grit, such as quartz, with which attapulgite in its natural form often is associated, is removed mechanically. The resultant dispersion is relatively stable against settling and, at concentrations of 5 to 10 percent by weight, which is a convenient concentration to use in the steps which follow, is relatively viscous.

If, in effecting the dispersion, the pH has deviated substantially from neutral it can be adjusted back to neutral by a suitable addition of acid or alkali. For instance, if an alkaline phosphate is used it may be desirable to add a sufficient amount of phosphoric acid to adjust the pH into the range of, say, 7 to 9. On the other hand, it may be more convenient to use a dispersing agent which is only weakly alkaline, such as sodium hexametaphosphate.

Having prepared a suitable aqueous dispersion of the attapulgite there is added an organic liquid to replace the water. This organic liquid must be at least partially water-miscible. It is important that there be at least some water-miscibility since otherwise the subsequent drying of the attapulgite will cause irreversible agglomeration of the attapulgite. It will therefore be apparent that organic liquids which have only a very sparing solubility in water are substantially less effective than those which are more water-miscible. If only about 1 percent of the organic liquid is miscible with water, as in the case of butyl acetate, it will have some effect, but it is preferred to use liquids which are miscible with water in the proportion of about 5 percent or more by weight. Obviously, the organic liquid can be completely miscible with water.

On the other hand, complete miscibility is not necessarily the most desirable condition, since in the preferred embodiment of the invention water is removed by azeotropic distillation. Liquids which have characteristics adapting them to the removal of water as an azeotrope are for this aspect of the process preferred. Where the removal of the water is to be effected by distilling azeotropically it is important that the organic liquid form with water an azeotrope having a boiling point below that of either the organic liquid or the water.

Examples of organic liquids which are at least partially water-miscible are: methylethyl ketone, secondary butyl alcohol, acetone, isopropanol, methylethylbutylcarbinol, ethanol, methanol, methylpropyl ketone, and methylethylisobutyl ketone. Examples of liquids which are particularly useful in that they form the desired type of azeotrope with water are n-propanol and n-butanol.

The important thing at this stage is to replace the water with an organic liquid in order to prevent the attapulgite from irreversibly reagglomerating as has been the case with prior art processes. Thus, while the water is being removed as by azeotropic distillation, it is desirable to maintain an excess or residue of the organic liquid. The organic liquid can then be removed by evaporation or by heating the mixture under pressure above the critical temperature and venting. However, it will be understood that it is not necessary to remove the residue of organic liquid if it does not interfere with the subsequent treatment with organosilane. Organosilanes are reactive with hydroxylated compounds; hence, if the organic liquid used is a hydroxylated compound as, for instance, an alcohol, the residue should be removed before proceeding with the next step. This can be done, for instance, by replacing the reactive solvent with an inert one, such as benzene, whereby the advantage of having the attapulgite dispersed in a liquid is retained.

The dispersed attapulgite is made organophilic and, optionally, also hydrophobic by treating it with a hydrolyzable organosilane. This is effected by adding the hydrolyzable organosilane under conditions which insure intimate contact between it and the attapulgite.

By hydrolyzable organosilane is meant a silane which is reactive with substances containing free hydroxyl groups to form products containing silanol groups. Such products, for instance, may contain a hydrolyzable group such as a chlorine attached to a silicon atom, the chlorine being readily hydrolyzable by contact with water, an alcohol, or another hydroxylated compound. Representative of this class of materials are the halosilanes such as mono-, di-, and tri-chlorosilanes, amino silanes, and silicone oils. Also, included are the alkoxy silanes such as mono-, di-, and tri-methoxy or ethoxy silanes. The silanes also contain organo groups such as methyl, ethyl, butyl, and phenyl groups attached directly to the silicon atom. For instance, one of the more common compounds which is available commercially and can be used to good advantage in the process is a mixture of dimethyldichlorosilane and monomethyltrichlorosilane. The organosilane can have from 1 to 3 directly-attached organo groups. Other, particular organosilanes which can be used are described in Patnode U. S. Patent 2,306,222.

The reaction between the organosilane and the dispersed attapulgite can be effected in the presence of an inert liquid as previously mentioned and can be accelerated by heating and by agitation of the reaction mixture.

If a halosilane is used, the excess halogen groups can be hydrolyzed readily by treatment with tertiary butyl alcohol.

The proportion of organosilane used should be sufficient to provide a monomolecular layer of silyl groups on the dispersed attapulgite. Any excess over this amount will only have to be removed, but in some instances an improved rate of reaction will justify using an excess. The amount of organosilane required for a monomolecular coating varies in direct proportion to the specific surface area of the attapulgite in its fibrillated condition. This surface area can readily be determined by the well-known nitrogen adsorption method (see P. H. Emmett's publication in Symposium on New Methods for Particle Size Determination in the Sub-Sieve Range, by American Society for Testing Materials, March 4, 1941, page 95).

It has been found that with a fibrillated attapulgite having a specific surface area of 150 square meters per gram, about 6 percent of trimethylchlorosilane or 22 percent of monomethyltrichlorosilane is sufficient to give coverage. This corresponds to about 6 methylsilyl groups per square millimicron of attapulgite surface or about 2.2 trimethylsilyl groups per square millimicrons ($m\mu^2$). For attapulgites higher specific surface area, proportionately more of the mixture is used. With organosilanes having higher molecular weight organo groups, less will be required to give complete coverage; thus in the case of ethyl and propyl compounds, a total of 3.4 organo groups per ($m\mu^2$) is sufficient while two will suffice in the case of phenyl.

The novel and unique products produced according to the above-described processes of this invention have an attapulgite base in fibrillated, deagglomerated form, upon the surface of which there is an organophilic coating of chemically bound organosilyl groups. In contrast to the size of attapulgite fibers in their naturally-occurring form, the fibrils of attapulgite in the products of this invention are substantially of colloidal size insofar as at least two of their dimensions are concerned, so that when redispersed—say, in a liquid medium—the products exhibit substantial colloidal character.

By reason of their deagglomerated, finely divided condition the surface area of the attapulgite fibrils in the products of this invention is more than about 150 $m.^2/g$. and in a representative product may be in the range of 150 to 250 $m.^2/g$. or more.

By comparing the specific surface area of the products, as determined by the nitrogen adsorption method described above, with their specific hydroxylated surface areas, as determined by dye adsorption, a measure of the extent to which the surface has been covered with organosilyl groups is obtained. The dye adsorption method for determining specific hydroxylated surface area consists in measuring the amount of methyl red dye the sample can adsorb from an anhydrous benzene solution of the dye, as described in United States Patent 2,657,149 issued to R. K. Iler, column 19, line 54, to column 20, line 19. The preferred products of the present invention have a hydroxylated surface area, as determined by dye adsorption, of less than one third the total surface area as determined by nitrogen adsorption.

When the surface of the attapulgite fibrils is a chemically-bound layer of organosilyl groups, these groups cannot be extracted off by ordinary solvent extraction. The proportion of bound groups is sufficient to make the products at least organophilic and optionally also hydrophobic.

The organophilic character of the products can be demonstrated by the fact that they are preferentially wetted by an organic liquid in the presence of water. More particularly, as here used the term means the products are preferentially wetted by butanol in a butanol-water mixture. A simple test to demonstrate organophilic and hydrophobic character in the powdered products of the invention is carried out as follows:

The powder is slurried at least twice with an excess of warm methylethylketone and filtered to remove any liquid not chemically reacted with the attapulgite surface. It is then dried at 75° C. in a vacuum oven about twenty four hours. The dried powder is passed through a 200 mesh screen. A one fourth cc. sample of the powder is added to 10 cc. of distilled water at room temperature in a 30 cc. six inch long test tube. The tube is stoppered and given about five vigorous vertical shakes. The attapulgite material which has not wetted into the water (e. g., is floating on the surface) and does not wet into the water after standing for 15 minutes is considered to be hydrophobic. Then 10 cc. of normal butanol are added to the test tube and it is again stoppered and given five vigorous vertical shakes. It will be seen that the butanol forms a separate layer which floats on the water. The attapulgite product which rises above the interface and passes into suspension into the butanol layer upon gentle stirring is considered organophilic according to this test. (If an emulsion results upon shaking, it may be broken by gentle agitation with a glass stirring rod or by allowing the mixture to stand for as much as one half hour, if necessary, to complete the test.) The products of this invention are organophilic according to this test, and a preferred class of products are sufficiently highly reacted with organosilyl groups to be also hydrophobic and, consequently, water-resistant. All of the products of this invention are sufficiently organophilic that they will seek oil or an oil-water interface in an oil water system.

For organophilic products, 200 methyl groups, as organosilyl groups, per hundred square millimicrons of substrate surface area are required, whereas for hydrophobic products 600 groups per hundred square millimicrons are ordinarily required. Two hundred monomethylsilyl groups are equivalent to about 100 dimethylsilyl groups or 67 trimethylsilyl groups. For organosilyl groups containing larger organic radicals, such as phenyl groups, a smaller number of organosilyl groups will suffice to give the properties indicated; thus, in the case of phenyl the required number of groups can be cut by a factor of about 3 and in the case of other alkyl groups like ethyl or butyl by a factor of 2.

By reason of their non-agglomerated nature and their organophilic coating the products of the invention are easily dispersible in liquid and plastic organic systems.

Because of their excellent compatibility in organic systems the organophilic attapulgites of this invention are particularly useful for thickening oils to make greases and as fillers for elastomers including natural, GR–S, neoprene, and silicone rubbers.

The invention will be better understood by reference to the following illustrative examples:

Example 1

A sample of attapulgite clay was dispersed in an aqueous alkaline phosphate solution and the grit was removed. An electron micrograph of the dispersion showed that the attapulgite was dispersed to what appeared to be ultimate fibrils which were about 10 to 15 millimicrons in diameter. The sample had a pH of 9.8 and contained about 3 to 4 percent solids. The sample was pH-adjusted to 5.5; the solids were filtered, washed and dehydrated using n-butanol. The butanol was then removed by drying.

Ten g. of this dispersed, dried attapulgite were slurried in 100 ml. of benzene containing 5 g. of pyridine (to react with the liberated HCl). To this, 5 g. of dimethyldichlorosilane $(CH_3)_2SiCl_2$, in 50 ml. of benzene were added and the mixture heated to 75° C. for two hours. The slurry was then treated with 100 ml. of butanol and refluxed, in order to react with the excess chlorosilane. The treated attapulgite was recovered by centrifuging, washing with benzene and drying. The product was organophilic, i. e., in a water-butanol system it concentrated in the butanol layer.

Example 2

Five grams of attapulgite dispersed and dried from n-butanol as per Example 1 were shaken, while in the dried state, with 1 gram of ditertiary-butoxy diamino silane for 6 hours at room temperature. Two grams of butanol were then added to react with the excess silane, and, after standing several hours, the product was dried for 25 hours at 100° C. The product was mostly hydrophobic; it had a surface area as measured by dye adsorption of 11 m.$^2$/g.

I claim:

1. In a process for the preparation of a dispersible, organophilic attapulgite the steps comprising mixing attapulgite with water with sufficient intensity to fibrillate the attapulgite, whereby an aqueous dispersion is obtained, replacing the water in the dispersion with an organic liquid which is at least partially water-miscible, and thereafter effecting contact between the fibrillated attapulgite and a hydrolyzable organosilane, whereby the organosilane reacts with surface of the attapulgite to make it organophilic.

2. In a process for the preparation of a dispersible, organophilic attapulgite the steps comprising mixing attapulgite with water with sufficient intensity to fibrillate the attapulgite, whereby an aqueous dispersion is obtained, replacing the water in the dispersion with an organic liquid which is at least partially water-miscible, and thereafter effecting contact between the fibrillated attapulgite and a hydrolyzable organosilane in an inert liquid medium, whereby the organosilane reacts with surface of the attapulgite to make it organophilic.

3. In a process for the preparation of a dispersible organophilic attapulgite, the steps comprising mixing attapulgite with water with sufficient intensity to fibrillate the attapulgite, whereby an aqueous dispersion is obtained, adding to the dispersion an organic liquid which is at least partially water-miscible and with water forms an azeotrope having a boiling point below that of either the organic liquid or water, distilling to remove the water while maintaining a residue of the organic liquid, and thereafter effecting contact between the fibrillated attapulgite and a hydrolyzable organosilane, whereby the organosilane reacts with the surface of the attapulgite to make it organophilic.

4. In a process for the preparation of a dispersible, organophilic attapulgite the steps comprising mixing attapulgite with water with sufficient intensity to fibrillate the attapulgite, whereby an aqueous dispersion is obtained, adding to the dispersion an organic liquid which is at least partially water-miscible and with water forms an azeotrope having a boiling point below that of either the organic liquid or water, distilling to remove the water while maintaining a residue of the organic liquid, removing the residue of organic liquid, and thereafter effecting contact between the fibrillated attapulgite and a hydrolyzable organosilane whereby the organosilane reacts with the surface of the attapulgite to make it organophilic.

5. In a process for the preparation of a dispersible, organophilic attapulgite the steps comprising mixing attapulgite with water with sufficient intensity to fibrillate the attapulgite, whereby an aqueous dispersion is obtained, adding to the dispersion an organic liquid which is at least partially water-miscible and with water forms an azeotrope having a boiling point below that of either the organic liquid or water, distilling to remove the water while maintaining a residue of the organic liquid, removing the residue of organic liquid, by heating the mixture under pressure below the critical temperature and venting, and thereafter effecting contact between the fibrillated attapulgite and a hydrolyzable organosilane whereby the organosilane reacts with the surface of the attapulgite to make it organophilic.

6. In a process for the preparation of a dispersible, organophilic attapulgite the steps comprising mixing attapulgite with water with sufficient intensity to fibrillate the attapulgite, whereby an aqueous dispersion is obtained, adding to the dispersion an organic liquid which is at least partially water-miscible and with water forms an azeotrope having a boiling point below that of either the organic liquid or water, distilling to remove the water while maintaining a residue of the organic liquid, removing the residue of organic liquid, by distilling it off, and thereafter effecting contact between the fibrillated attapulgite and a hydrolyzable organosilane whereby the organosilane reacts with the surface of the attapulgite to make it organophilic.

7. In a process for the preparation of a dispersible, organophilic attapulgite the steps comprising mixing attapulgite with water with sufficient intensity to fibrillate the attapulgite, whereby an aqueous dispersion is obtained, adding normal butanol to the dispersion, distilling to remove water while maintaining a residue of the normal butanol, removing the residue of normal butanol, and thereafter effecting contact between the fibrillated attapulgite and a hydrolyzable organosilane whereby the organosilane reacts with the surface of the attapulgite to make it organophilic.

8. In a process for the preparation of a dispersible, organophilic attapulgite the steps comprising mixing attapulgite with water with sufficient intensity to fibrillate the attapulgite, whereby an aqueous dispersion is obtained, adding normal butanol to the dispersion, distilling to remove water while maintaining a residue of the normal butanol, removing the residue of normal butanol, and thereafter effecting contact between the fibrillated attapulgite and a organochlorosilane, whereby the chlorosilane reacts with the surface of the attapulgite to make it organophilic.

9. A dispersible, organophilic powder comprising a substrate of fibrillated attapulgite having a surface area greater than 150 m.$^2$/g., the substrate having organosilyl groups chemically bound to its surface.

10. A dispersible, organophilic powder comprising a substrate of fibrillated attapulgite having a surface area of 150 to 250 per m.²/g., the substrate having organosilyl groups chemically bound to its surface.

11. A dispersible organophilic powder comprising a substrate of fibrillated attapulgite having a surface area of 150 to 250 per m.²/g., the substrate having methylsilyl groups chemically bound to its surface.

References Cited in the file of this patent

UNITED STATES PATENTS

| | | |
|---|---|---|
| 2,610,167 | Te Grotenhuis | Sept. 9, 1952 |
| 2,657,149 | Iler | Oct. 27, 1953 |